US006475088B1

(12) United States Patent
Jones et al.

(10) Patent No.: US 6,475,088 B1
(45) Date of Patent: *Nov. 5, 2002

(54) APPARATUS FOR PROGRESSIVE JACKPOT GAMING

(76) Inventors: Daniel A. Jones, 5520 W. Del Rey, Las Vegas, NV (US) 89102; James P. Suttle, 1820 Poplar St., Las Vegas, NV (US) 89102

(*) Notice: Subject to any disclaimer, the term of this patent is extended or adjusted under 35 U.S.C. 154(b) by 0 days.

This patent is subject to a terminal disclaimer.

(21) Appl. No.: 09/466,305

(22) Filed: Dec. 17, 1999

Related U.S. Application Data

(63) Continuation of application No. 09/301,676, filed on Apr. 28, 1999, now Pat. No. 6,070,878, which is a continuation of application No. 08/967,849, filed on Nov. 12, 1997, now Pat. No. 6,073,930, which is a continuation of application No. 08/695,275, filed on Aug. 9, 1996, now Pat. No. 5,794,964, which is a continuation of application No. 08/486,700, filed on Jun. 7, 1995, now Pat. No. 5,544,893, which is a continuation of application No. 08/337,661, filed on Nov. 9, 1994, now Pat. No. 5,626,341, which is a division of application No. 07/800,631, filed on Nov. 27, 1991, now Pat. No. 5,288,077, which is a continuation-in-part of application No. 07/361,276, filed on Jun. 5, 1989, now Pat. No. 5,078,405, which is a division of application No. 07/214,934, filed on Jul. 5, 1988, now Pat. No. 4,861,041, which is a continuation-in-part of application No. 07/182,374, filed on Apr. 18, 1988, now Pat. No. 4,836,553.

(51) Int. Cl.[7] .............................. A63F 1/00; A63F 13/00

(52) U.S. Cl. .............................. 463/27; 463/12; 463/13; 463/25; 463/29; 463/42; 273/309; 273/292

(58) Field of Search ........................... 273/138.1, 138.2, 273/274, 309, 292; 463/12, 13, 42, 25, 27, 29

(56) References Cited

U.S. PATENT DOCUMENTS

| | | | | |
|---|---|---|---|---|
| 3,819,186 A | * | 6/1974 | Hinterstocker | 273/138.2 |
| 4,614,342 A | * | 9/1986 | Takashima | 463/13 |
| 4,643,425 A | * | 2/1987 | Herzenberger | 273/142 B |
| 6,070,878 A | * | 6/2000 | Jones et al. | 273/309 |

FOREIGN PATENT DOCUMENTS

| | | | | |
|---|---|---|---|---|
| DE | 2609169 | * | 9/1982 | 273/138.2 |

OTHER PUBLICATIONS

*The Gambling Times Guide To European and Asian Games*, by Syd Helprin, A Gambling Times Book Distributed by Lyle Stuart, Secaucus, NJ © 1986 by Gambling Times Incorporated.

* cited by examiner

*Primary Examiner*—Benjamin H. Layno

(57) ABSTRACT

An apparatus including a progressive jackpot component in a live casino table game. In addition to playing a live casino table game, each player makes an additional wager at the beginning of each hand that makes that player eligible to win all or part of a jackpot. If during the play of the hand a player is dealt a predetermined arrangement of cards, the player wins a preselected percentage of the jackpot amount. The jackpot is progressive in that unwon amounts of the jackpot carry over to the next hand. The apparatus is provided to receive each gaming token wagered for the jackpot component. An electronic sensor is operated to sense each wagered gaming token, and an indicator is operated in response to the sensor to produce a signal indicating whether each wagered gaming token was received. The apparatus is also provided to increment the jackpot meter which displays the jackpot amount, to decrement the jackpot meter whenever a winning hand is paid and to reset the apparatus for the next hand.

15 Claims, 4 Drawing Sheets

APPARATUS FOR PROGRESSIVE JACKPOT GAMING

CROSS REFERENCE TO RELATED APPLICATIONS

This application is a continuation of application Ser. No. 09/301,676, filed Apr. 28, 1999, and now U.S. Pat. No. 6,070,878, which is a continuation of application Ser. No. 08/967,849, filed Nov. 12, 1997, and now U.S. Pat. No. 6,073,930, which is a continuation of application Ser. No. 08/695,275, filed Aug. 9, 1996, and now U.S. Pat. No. 5,794,964 which is a continuation of application Ser. No. 08/486,700, filed Jun. 7, 1995, and now U.S. Pat. No. 5,544,893, which is a continuation of application Ser. No. 08/337,661, filed Nov. 9, 1994, and now U.S. Pat. No. 5,626,341, which is a division of application Ser. No. 07/800,631, filed Nov. 27, 1991, now U.S. Pat. No. 5,288,077; which is a continuation-in-part of application Ser. No. 07/361,276, filed Jun. 5, 1989 and now U.S. Pat. No. 5,078,405; which is a division of application Ser. No. 07/214,934, filed Jul. 5, 1998 and now U.S. Pat. No. 4,861,041; which is a continuation-in-part of application Ser. No. 07/182,374 filed Apr. 18, 1988, now U.S. Pat. No. 4,836,553. The entire disclosures of each of the above-listed applications and patents are hereby incorporated by reference herein. The entire disclosure of copending application Ser. No. 07/814,712 filed Dec. 30, 1991 is also hereby incorporated by reference herein.

BACKGROUND OF THE INVENTION

The present invention generally relates to casino or cardroom gaming involving a progressive jackpot. More particularly, it relates to a progressive jackpot that is available to be played by participants in various casino or cardroom table games.

It has become common practice in gaming establishments to provide a progressive jackpot component in connection with electronic or mechanical gaming devices, such as slot machines, video poker machines or keno machines. Typically a plurality or "bank" of machines are electronically interconnected to a common progressive jackpot meter. As gaming tokens are fed into each machine, the amount shown on the jackpot meter progresses incrementally until some lucky player lines up the winning combination, such as three or four 7's on the game row of a slot machine. In video poker, a Royal Flush normally wins the jackpot, although in some variations, a player must achieve a Royal Flush in an exact order, such as A-K-Q-J-10 from left to right, or in a particular suit, such as Spades. In video keno, a player typically must match 15 out of 15 numbers to win the progressive jackpot.

It is an object of the present invention to provide a progressive jackpot component to typical casino or cardroom table games such as poker or Twenty-One.

It is a feature of the present invention to have each participant in the progressive jackpot component win all or part of the amount shown on the progressive jackpot meter if the participant achieves a particular predetermined playing hand.

It is an advantage of the present invention that when the progressive jackpot component is added to typical table games such as poker or Twenty-One that the players will enjoy these games more and that the amount of play will increase.

It is a further object of the present invention to provide apparatus useful in providing the progressive jackpot component to casino or cardroom table games such as poker or Twenty-One.

It is a further feature of the present invention to have a progressive jackpot meter electronically interconnected to one or more gaming tables to allow each player at his playing location to participate in the progressive jackpot component by wagering a gaming token which automatically activates an indicator showing the player's participation and also automatically increments the progressive jackpot meter.

It is an advantage of the present invention that the apparatus makes it easy for each player to participate in the progressive jackpot component of the game.

BRIEF SUMMARY OF THE INVENTION

The method of the present invention generally involves a typical casino or cardroom game modified to include a progressive jackpot component. During the play of a Twenty-One game, for example, in addition to his normal wager, a player will have the option of making an additional wager that becomes part of, and makes the player eligible to win, the progressive jackpot. If the player's Twenty-One hand comprises a particular, predetermined arrangement of cards, the player will win all, or part of, the amount showing on the progressive jackpot. This progressive jackpot feature is also adaptable to any other casino or cardroom game such as Draw Poker. Stud Poker, Lo-Ball Poker or Caribbean Stud™ Poker.

The apparatus used to practice the present invention comprises a gaming table, such as those used for Twenty-One or poker, modified with the addition of a coin acceptor that is electronically connected to a progressive jackpot meter. When a player drops a coin into the coin acceptor, a light is activated at the player's location indicating that he is participating in the progressive jackpot component of the game during that hand. At the same time, a signal from the coin acceptor is sent to the progressive meter to increment the amount shown on the progressive meter. At the conclusion of the play of each hand, the coin acceptor is reset for the next hand. When a player wins all or part of the progressive jackpot, the amount showing on the progressive jackpot meter is reduced by the amount won by the player. Any number of gaming tables can be connected to a single progressive jackpot meter.

DETAILED DESCRIPTION OF THE PREFERRED EMBODIMENTS

Figure 1:
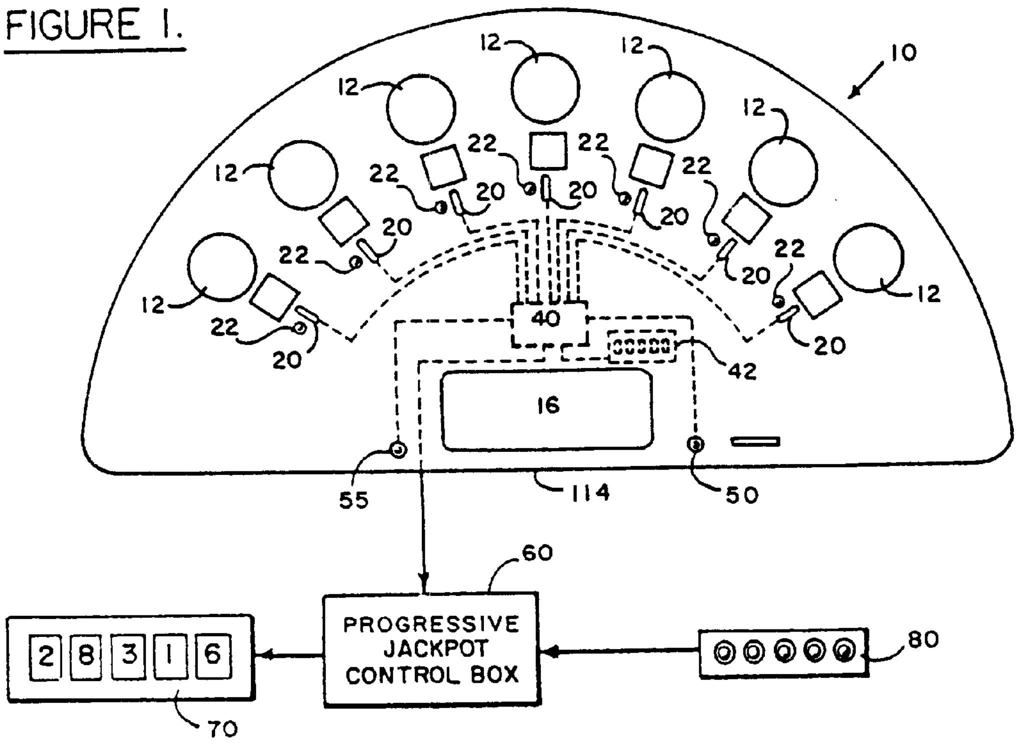
FIG. 1 shows the apparatus of the present invention using a casino gaming table with coin acceptors at each playing location electronically connected to a progressive jackpot meter.

As shown in FIG. 1, a casino gaming table 10 is provided having a plurality of playing locations 12 for players participating in the game being conducted, e.g., Twenty-One. A dealer is position at the dealer's location 14 adjacent a chip rack 16. Adjacent to each player location 12 is a coin acceptor 20. Each coin acceptor 20 is electronically connected to a main control board 40 to which is connected a number of odometer-type counters 42 corresponding to the number of playing locations 12 provided on the gaming table 10. As shown in FIG. 1, seven playing locations 12 are preferably provided, although the number of playing locations can be more or less than seven. A reset switch 50 is located adjacent the dealer's location 14 and is electronically connected to the main control board 40 and provides a means whereby the dealer can reset the coin acceptors 20 prior to the beginning of the play of each hand. A lockout switch 55, is also provided adjacent to the dealer's location 14 which is activated by the dealer to prevent later wagering as will be more fully explained herein.

A main control board 40 is electronically connected to a progressive jackpot control box 60 which receives the signals from each coin acceptor 20 and in response to those signals increments the progressive jackpot meter 70, as will be more fully explained herein. Also electronically connected to the progressive control box 60 is the jackpot reset control 80 which provides means for resetting the amount shown on the progressive jackpot meter whenever a player wins all, or part of, the amount shown on the progressive jackpot meter 70.

In operation, the present invention operates as follows. A conventional Twenty-One game is conducted on gaming table 10. At the beginning of each hand, each player, in addition to making his usual wager for the play of the Twenty-One hand, may also make an additional wager to be eligible to participate in the progressive jackpot component of the game during that hand. To do so, a player places a gaming token into the coin acceptor 20 associated with that player's particular playing location 12. As will be more fully explained herein, the coin acceptor 20 "recognizes" that a gaming token has been placed therein and an indicator signal 22, preferably a light, adjacent to the coin acceptor 20 is activated showing that that particular player is participating in the progressive jackpot component of the game during the play of that hand.

Besides activating the indicator signal 22, the coin acceptor 20 also sends an electronic signal to the main control board 40. This signal is sent by the main control board 40 to the odometer-type counter 42 corresponding to the particular playing location 12 to keep a sequential count of the number of gaming tokens that are placed in the particular coin acceptor 20.

The main control board 40 also activates the progressive jackpot control box 60 which in turn controls the progressive jackpot meter 70. Each gaming token placed in a coin acceptor 20 results in the amount shown on the progressive jackpot meter being increased by a predetermined amount. If, for example, each gaming token has a value of one dollar, then the amount shown on the progressive jackpot meter would be increased by any amount up to one dollar for each gaming token placed into a coin acceptor 20. In the preferred embodiment of the present invention, the progressive jackpot would be increased between 93% to 97% of the amount of each gaming token being wagered, the balance representing the house's share of the amount wagered for providing the progressive jackpot component of the game.

When each player has had a reasonable opportunity to make a progressive jackpot wager, the dealer activates lockout switch 55 which deactivates each coin acceptor 20. Any tokens placed in a coin acceptor 20 after lockout switch 55 is activated will not register. This prevents late wagering after the cards are dealt.

The amount shown on the progressive jackpot meter will continue to increase for each gaming token wagered until a player achieves a winning hand. Preselected winning hands earn a player all or part of the amount shown on the progressive jackpot meter. In a preferred embodiment, the preselected wining hands and payoff amounts in Twenty-One game are as follows:

| Winning Hand | Amount of Jackpot |
|---|---|
| Four 5's and an Ace | 100% |
| Ace, two, three, four, five and six | 4% |
| Six, seven and eight of same suit | 100 tokens |
| Three 7's | 50 tokens |

The invention is not limited to these particular combinations of winning hands or payoffs, other winning hand combinations or payoff amounts can be utilized.

When a player achieves a winning hand, the jackpot reset control 80 is manually activated by pushing a button that corresponds to the type of hand that the player achieved. The amount won by the player is thus electronically deducted from the amount showing on the progressive jackpot meter.

When a particular hand is completed at gaming table 101, the dealer presses the reset switch 50, which deactivates the indicator signal 22. Lockout switch 55 is also manually deactivated by the dealer. The coin acceptor 20 is thus readied to receive another gaming token for the next hand.

The progressive jackpot component of the present invention can also be used in connection with other types of casino games, e.g., Caribbean Stud™ Poker, which is the subject matter of U.S. patent application Ser. No. 07/182,374filed Apr. 18, 1988, which is incorporated herein by reference thereto. Caribbean Stud™ Poker is a modification of conventional five-card stud poker. Each player makes an ante and a dealer deals five cards to each player and to himself. The player's cards are dealt face down and the dealer's cards are dealt four cards face down and one card face up. Each player views his hand then decides whether to continue to play by making an additional bet or to fold or drop, in which case he loses his ante. The dealer then reveals his entire hand; if the dealer's hand does not have a poker value of at least Ace-King, then the dealer is not permitted to continue to play. In that case, the dealer pays even money on the remaining players'antes, and returns their bets to them. If the dealer's hand has a poker value of Ace-King or better, the dealer compares his hand to each player's hand, paying or collecting the bets as appropriate. The dealer also pays odds of more than even money on each winning player's hand of two pair or better according to a bonus payment schedule. This game can be played using the gaming table shown in FIG. 1. Each player makes a progressive jackpot wager by placing a gaming token in the coin acceptor 20 which makes that player eligible to participate in the progressive jackpot amount shown on the meter 70. The winning hands and amounts for Caribbean Stud Poker are preferably as follows:

| Hand | Amount |
|---|---|
| Royal Flush | 100% |
| Straight Flush | 10% |

-continued

| Hand | Amount |
|---|---|
| Four of a Kind | 1% |
| Full House | 50 tokens |
| Flush | 25 tokens |

Again the invention is not limited to these particular combinations of hands or payoff amounts, other hand combinations or payoff amounts can be utilized.

Figure 2:
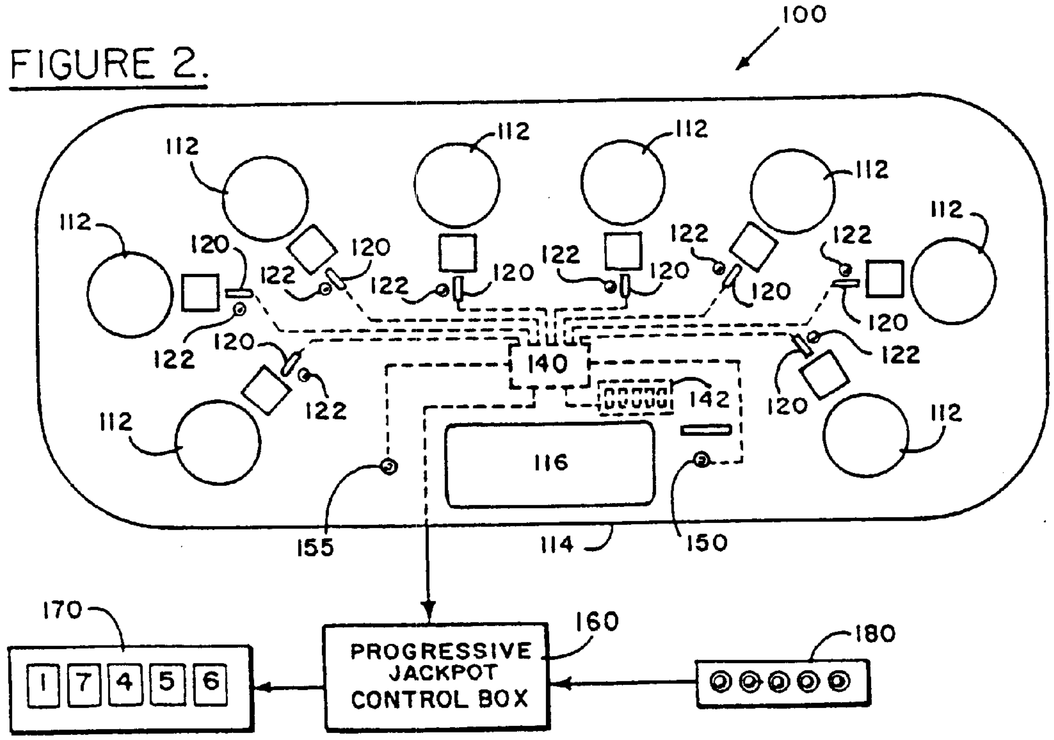
FIG. 2 shows an alternate embodiment of the present invention using a cardroom gaming table with coin acceptors at each playing location electronically connected to a progressive jackpot meter.

The invention can also be adapted to other casino or cardroom poker games such as Stud Poker, Draw Power or Lo-Ball Poker. The gaming table 100 used to play each of these games is modified as shown in FIG. 2 by the addition of coin acceptors 120 and indicator signals 122 at each player's location 112. The electronics is the same as that shown in FIG. 1 and includes a main control board 140, an odometer-type counter 142, a progressive jackpot control box 160, a progressive jackpot meter 170 and a jackpot reset control 100. A reset switch 150 and a lockout switch 155 are located adjacent the dealer's location 114 next to the chip rack 116.

The progressive jackpot meter 170 is incrementally increased in the same manner as that described in connection with FIG. 1 by each player placing a gaming token in the coin acceptor 120.

The winning hands and payoff amounts are preselected as appropriate for the type of game being played. In the preferred embodiment, the winning hands and payoff amounts are as follows:

I. Five Card Draw Poker

| Hand | Amount |
|---|---|
| Royal Flush | 100% |
| Straight Flush | 10% |
| Four of a Kind | 100 tokens |
| Full House | 25 tokens |

II. Five Card Stud Poker

| Hand | Amount |
|---|---|
| Royal Flush | 100% |
| Straight Flush | 10% |
| Four of a Kind | 100 tokens |
| Full House | 25 tokens |

III. Seven Card Stud Poker

| Hand | Amount |
|---|---|
| Royal Flush | 100% |
| Straight Flush | 10% |
| Four of a Kind | 100 tokens |
| Full House | 25 tokens |

IV. Lo-Ball Poker

| Hand | Amount |
|---|---|
| 5-4-3-2-Ace | 100% |
| 6-4-3-2-Ace | 5% |
| 6-5-3-2-Ace | 100 tokens |
| 7-4-3-2-Ace | 25 tokens |

These winning hands and payoff amounts are merely preferred embodiments and the invention may be practiced using any appropriate combination of winning hands and payoff amounts.

As an alternative embodiment, progressive jackpot component of the game may be utilized as a consolation payoff for a player who otherwise loses during the play of the regular game. For example, assume the regular game being played is Five Card Stud. Players A and B are both eligible for the progressive jackpot amount because each has placed a gaming token in the coin acceptor prior to the beginning of the play of the hand. Player A holds a hand having Four of a Kind. Player B holds a Full House. Because Player A's hand is higher according to the customary poker hand ranking priority, Player A wins the pot wagered on the Five Card Stud game. As a consolation, however, Player B receives a payoff amount from the progressive jackpot for his Full House, e.g., 25 tokens. Player A does not receive a payoff from the progressive jackpot because he already has won the pot from the regular Five Card Stud game. Thus, under this alternative embodiment, a player only receives a payoff from the progressive jackpot if the player both has a hand of the preselected type and loses to a higher hand in the game being played.

Another modification would have the two players sharing in the progressive jackpot amount; the player with the preselected type of hand receiving a percentage of the progressive jackpot amount and the player with the higher poker hand receiving the rest of the progressive jackpot amount. With reference to the example above, Player B would receive 80% of the progressive jackpot amount for a Full House and Player A would receive 20% of the progressive jackpot amount for a Full House.

Figure 3:
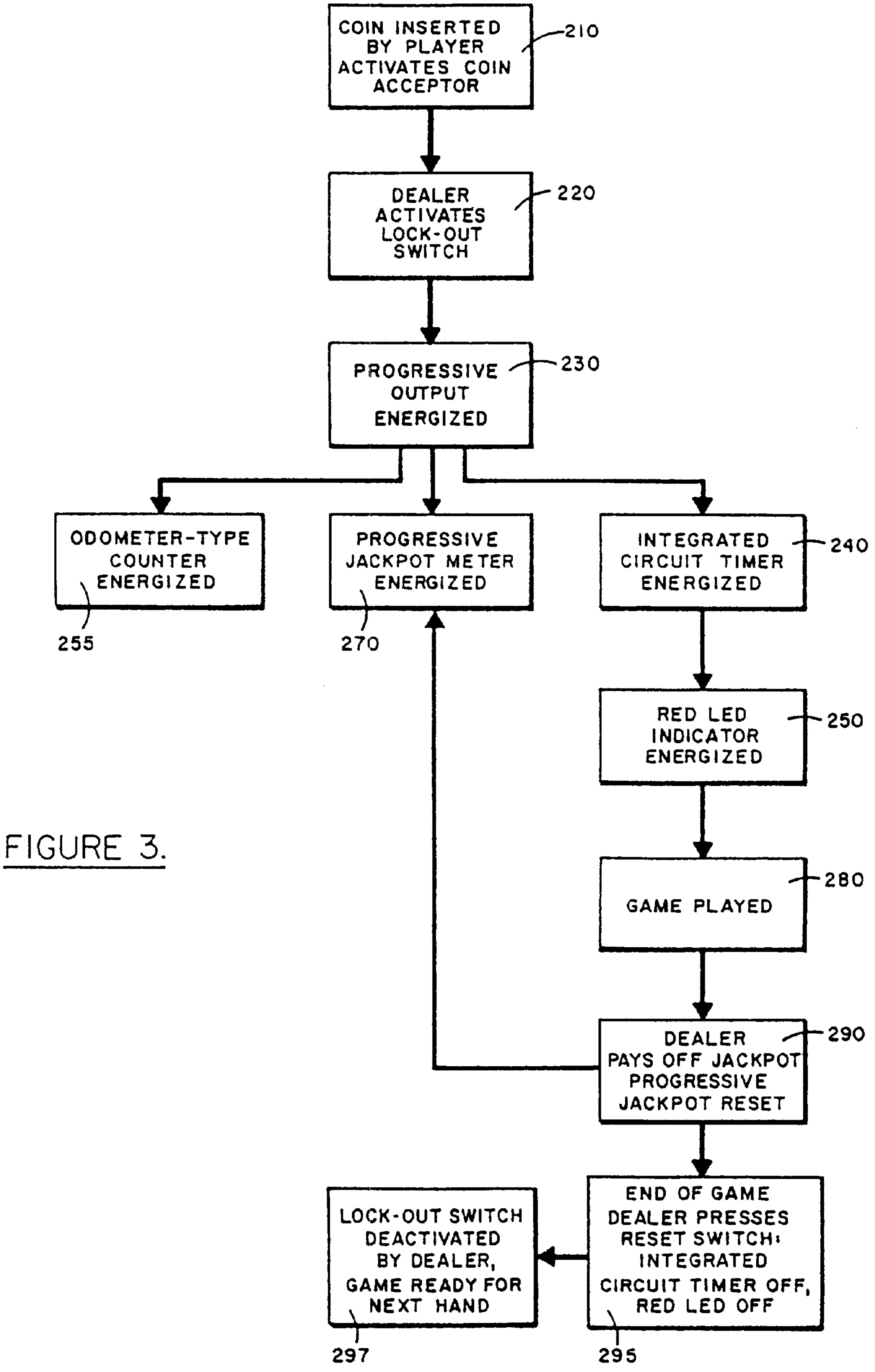
FIG. 3 shows a block diagram of the operation of the present invention.

FIG. 3 shows in block diagram form the operation of the present invention. Each playing location has a coin a acceptor 210 into which a player places a gaming token in order to be eligible for the progressive jackpot amount. When all players have had sufficient time to decide whether to participate in the progressive jackpot for that hand the dealer activates the lockout switch 220 which prevents late wagers. Each gaming token placed in a coin acceptor 210 energizes the progressive output control 230 which in turn activates three separate devices. An integrated circuit timer is energized which causes an indicator light 250 to be illuminated at the location on the coin acceptor in front of the player. This gives a visual indication to the dealer that that player is participating in the progressive jackpot during the play of that hand.

The signal from the progressive jackpot control 230 also activates an odometer-type counter 255 which increments by one unit for each gaming token wagered through the coin acceptor. This allows the gaming establishment to keep an accurate count of the number of wagers made on the progressive jackpot.

The third signal from the progressive jackpot control 230 goes directly to the progressive jackpot meter 270. The progressive jackpot meter 270 shows the total amount available to be won by a player who obtains one of the preselected winning hands. The amount of the progressive jackpot meter 270 automatically increases a predetermined amount for each gaming token placed in a coin acceptor. The progressive jackpot meter 270 is programmed to increase a specified percentage of the amount wagered in the coin acceptor 210. In the preferred embodiment, the progressive jackpot meter will be increased between about 93% to 97% of the amount wagered in the coin acceptor 210.

The dealer then deals the cards to each player and the hand is played 280. If a player has a preselected winning hand, the player is paid the amount corresponding to the type of winning hand that the player has. The jackpot reset control 290 is manually activated which results in the amount of the payoff being automatically deducted from the amount displayed on the progressive jackpot meter 270.

After the winning players have been paid, the dealer activates the reset switch 295 which both turns off the integrated circuit timer 240 and turns off the indicator light 250 and the dealer deactivates the lockout switch 297 thereby activating the coin acceptor 210 for the next hand.

Figure 4:
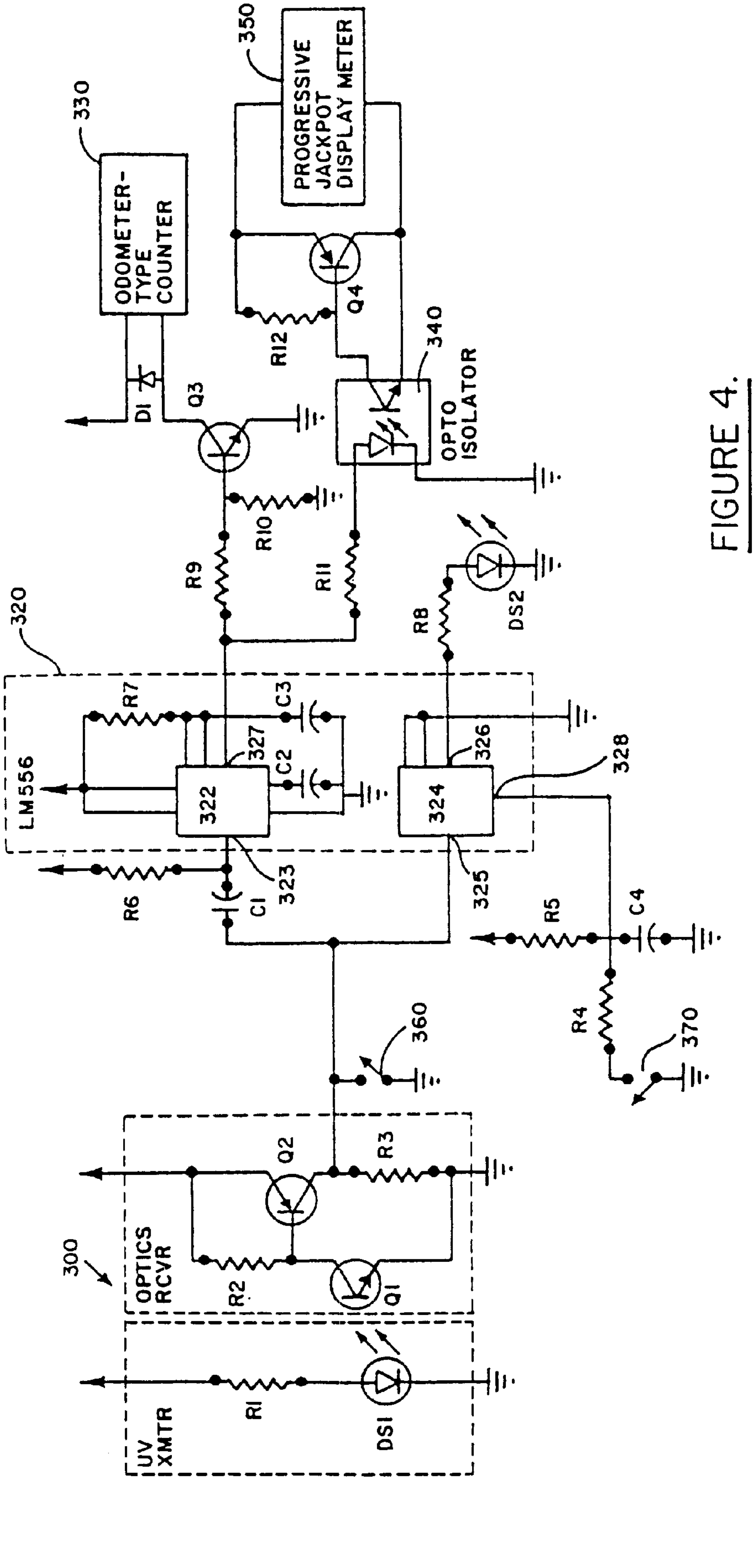
FIG. 4 shows a schematic diagram of the electronic circuitry of the present invention.
Figure 5:
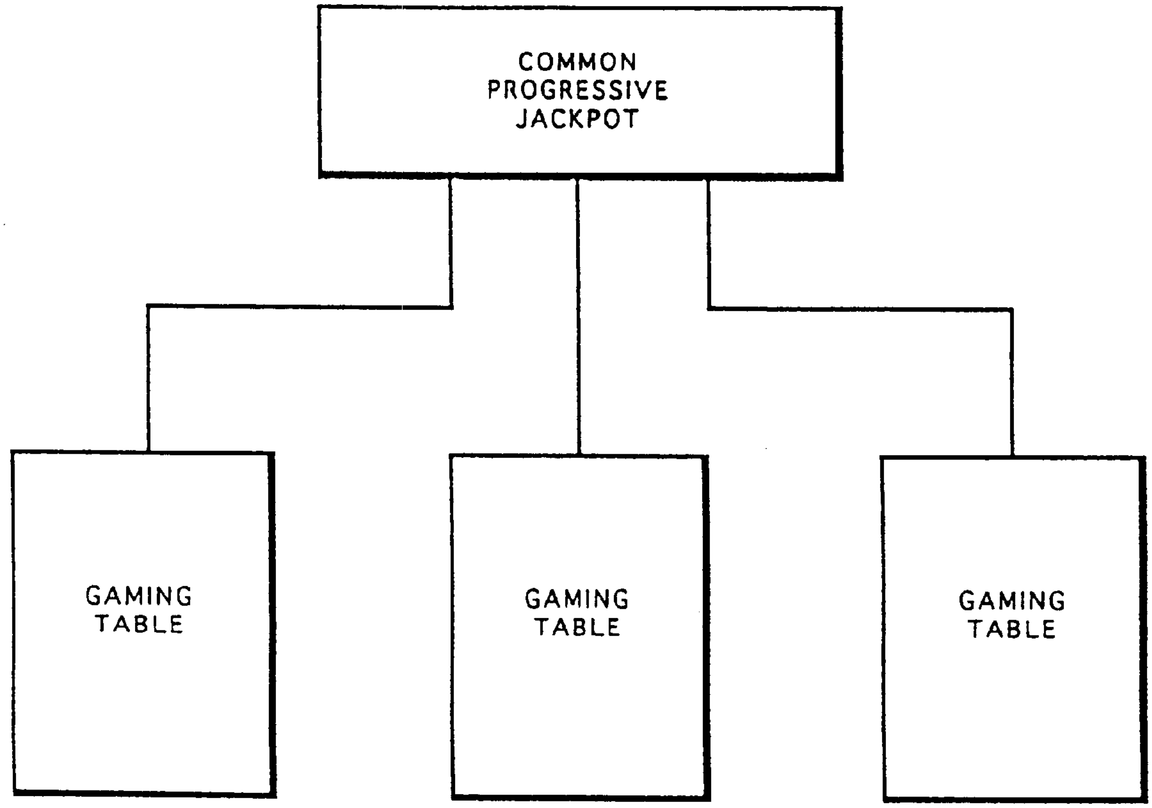
FIG. 5 shows a block diagram of a plurality of gaming tables connected to a single progressive jackpot meter.

FIG. 4 in schematic form depicts the electronic circuitry to operate the apparatus of the present invention. The coin acceptor circuitry 300 is activated when a gaming token is dropped into the slot on the gaming table where the coin acceptor is mounted. The gaming token passes between an ultraviolet transmitter DS1 and an optic receiver Q1 (Model #MRD 300 transistor). This causes a pulse to be passed from the collector of Q1 to the base of receiver Q2. Q2 is a Model #2N3906 transistor and acts as an emitter follower and sends a pulse which is received by the integrated circuit 322, 324 of the main control board 320. The integrated circuit 322, 324 is a Model #LM-556 Timer. The pulse from Q2 is received at pin 325 of the lower portion 324 of the integrated circuit and this pulse causes pin 326 of the lower portion 324 to go high and turn on diode DS2 (a Model P367 diode). This diode DS2 is the indicator light 22 shown in FIG. 1 and this indicator light 22 stays on until the play of the hand is finished.

The pulse from Q2 also is received by pin 323 on the upper portion 322 of the integrated circuit and this pulse creates a pulse at pin 327 of the upper portion 322 which causes transistor Q3 (a Model #T1P120 transistor) to turn on, then off for the duration of the pulse created at pin 327. The turning on and off of transistor Q3 causes the odometer-type counter 42 shown in FIG. 1 to increment one digit. The odometer-type counter 330 is a six-digit non-resetable electronic 12VDC counter WICO Model #31-443400.

The pulse created at pin 327 of the upper potion 322 of the integrated circuit also goes to the opto isolator 340 (which is a Model #H11A16E Opto isolator). The opto isolator 340 passes this pulse to the base of translator Q4 (a Model #2N3906 transistor) thereby turning on transistor Q4 for the duration of the pulse. When transistor Q4 is turned on, the pulse is passed to the progressive jackpot display meter 350 where the amount shown on the display meter 350 is increased by a predetermined percentage of the value of the gaming token placed in the coin acceptor 300. The progressive jackpot display meter 350 can typically be a Game Technology Model having 3" LED characters on a 44" length single progressive display.

After all bets are made, the dealer manually presses a lockout switch 360 which will clamp the output of transistor Q2 at a low level which ensures that there can be no late wagers made through the coin acceptor 300. Once the output of transistor Q2 is clamped at a low level, a gaming token placed in the coin acceptor 300 will not cause a pulse to flow through the rest of the circuitry.

The game is then played and once the game is completed, the dealer will manually press the reset switch 370 which creates a reset pulse that activates pin 320 which resets the lower portion 324 of the integrated circuit. This resetting causes pin 326 to go low which will extinguish diode DS2 which turns off the indicator light 22 on the gaming table.

The dealer also manually presses the lockout switch 360 to open the circuit and remove the clamp on the emitter of transistor Q2 which allows another hand to be played. The players commence the next hand by placing gaming tokens in the coin acceptor 300 and the process is repeated.

As will be apparent to those skilled in the art, various resistors and capacitors are provided to complete the circuitry. The specifications on the resistors and capacitors shown in FIG. 4 is as follows:

| Resistors | | | Capacitors | | |
|---|---|---|---|---|---|
| R1 | - | 68 Ohm | C1 | - | .1 ufd/35 v |
| R2 | - | 3 Kohm | C2 | - | .01 ufd/35 v |
| R3 | - | 1 Kohm | C3 | - | .1 ufd/35 v |
| R4 | - | 200 Ohm | C4 | - | .1 ufd/35 v |
| R5 | - | 4.7 Kohm | | | |
| R6 | - | 10 Kohm | | | |
| R7 | - | 1 Mohm | | | |
| R8 | - | 240 Ohm | | | |
| R9 | - | 1 Kohm | | | |
| R10 | - | 4.7 Kohm | | | |
| R11 | - | 240 Ohm | | | |
| R12 | - | 1 Kohm | | | |

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A table for playing a wagering game, said table having a plurality of player locations at which a player receives tangible, physical cards from a live human dealer, said table including:

(a) an electronic sensor operative to sense the making of a wager by a player; and (b) an indicator operative in response to said sensor to produce a signal indicating whether a player has made said wager.

2. A table according to claim 1 wherein said sensor includes and optical detector to sense the presence of a gaming token.

3. A table according to claim 1 wherein said signal comprises a light signal.

4. A table according to claim 1 further including a counter electronically interconnected to said sensor and operative to count wagers sensed by said sensor.

5. A table according to claim 1 further including a controller electronically interconnected with said sensor and operative to register the occurrence of said sensor sensing said wager.

6. A table according to claim 5 further including a manually operable lock out switch operatively connected to deactivate said sensor such that said controller does not register the occurrence of a player making said wager.

7. A table for playing a wagering game, said table having a plurality of player locations at which a player receives tangible, physical playing cards from a live human dealer, said table including:

(a) an electronic sensor operative to sense the making of a wager by a player; and (b) a counter electronically interconnected to said sensor and operative to count wagers sensed by said sensor.

8. A table according to claim 7 wherein said sensor includes an optical detector operative to sense the presence of a gaming token.

9. A table for playing a wagering game, said table having a substantially horizontal playing surface substantially defined by a tangible, physical sheet of flexible material that may be rolled bearing information indicating locations on the sheet where wagers may be placed, said table including:

(a) an electronic sensor operative to sense the making of a wager by a player; and (b) an indicator operative in response to said sensor to produce a signal indicating whether a player has made said wager.

10. A table according to claim 9 wherein said sensor includes an optical detector operative to sense the presence of a gaming token.

11. A table according to claim 9 wherein said signal comprises a light signal.

12. A table according to claim 9 further including a counter electronically interconnected to said sensor and operative to count wagers sensed by said sensor.

13. A table according to claim 9 further including a controller electronically interconnected with said sensor and operative to register the occurrences of said sensor sensing said wager.

14. A table according to claim 13 further including a manually operable lock out switch operatively connected to deactivate said sensor such that said controller does not register the occurrence of a player making said wager.

15. A table for playing a wagering game, said table having a substantially horizontal playing surface substantially defined by a tangible, physical sheet of flexible material that may be rolled bearing information indicating locations on the sheet where wagers may be placed, said table including:

(a) an electronic sensor operative to sense the making of a wager by a player; and (b) a counter electronically interconnected to said sensor and operative to count wagers sensed by said sensor.

* * * * *